United States Patent Office 2,741,621
Patented Apr. 10, 1956

2,741,621

ANTHRAQUINONE VAT DYESTUFFS

Eduard Moergeli and Adolf Emil Siegrist, Basel, and Kurt Hoelzle, Liestal, Switzerland, assignors to Ciba Limited, Basel, Switzerland, a Swiss firm No Drawing. Application July 22, 1954,
Serial No. 445,159

Claims priority, application Switzerland July 27, 1953

8 Claims. (Cl. 260—307.5)

This invention provides anthraquinone vat dyestuffs which, like, for example, the dyestuff of the formula (1)

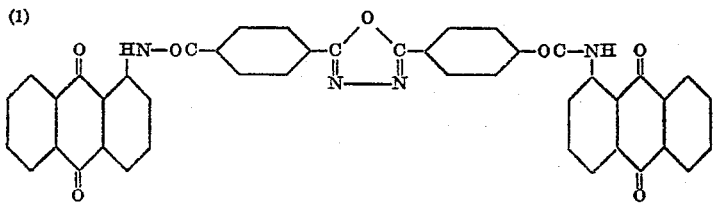

contain an acyl radical derived from a dicarboxylic acid containing at least one oxdiazole ring, and in which the —CO— groups of the acyl radical are bound to amino-anthraquinone radicals.

This invention also provides a process for the manufacture of the above new dyestuffs, by condensing two molecular proportions of an aminoanthraquinone or one molecular proportion each of two different aminoanthraquinones with one molecular proportion of a reactive derivative of a dicarboxylic acid in such manner as to form bilaterally carboxylic acid anthraquinonyl-amide groups, wherein the dicarboxylic acid derivative used is derived from a dicarboxylic acid containing at least one oxdiazole ring.

As reactive derivatives of the aforesaid dicarboxylic acids there come into consideration, especially their dihalides and among the latter, preferably the dichlorides. These halides can be obtained in known manner from the dicarboxylic acids. It is especially advantageous to prepare the dichlorides with the aid of thionyl chloride in an inert solvent or diluent, as the mixture so obtained can be used, after the formation of the acid halide and distillation of the excess of thionyl chloride, directly for the condensation with the aminoanthraquinones.

There are advantageously used derivatives of dicarboxylic acids of the constitution (2)

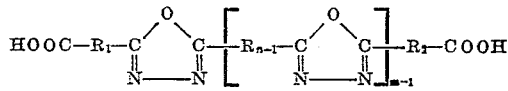

in which R, R₁ and R₂ represent any desired organic radicals of which at least one contains a system of conjugated double bonds and is also conjugated with the double bonds of the oxdiazole ring to which it is attached, and in which $m$ and $n$ represent lower whole numbers, advantageously a whole number not greater than 2.

Good results are obtained in the present process with derivatives of dicarboxylic acids of the formula (3)

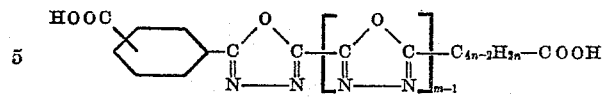

in which $m$ and $n$ each represent a whole number not greater than 2. Valuable dyestuffs are obtained especially with those derivatives of dicarboxylic acids of the Formula 3 which contain as radicals of the constitution

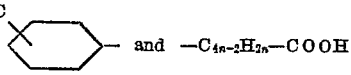

benzene carboxylic acid radicals bound to the oxdiazole ring in para-position relatively to the carboxyl group, that is to say, derivatives of dicarboxylic acids of the Formulae 5 and 8 below.

The dicarboxylic acids can be prepared, for example, by treating a compound of the formula (4)

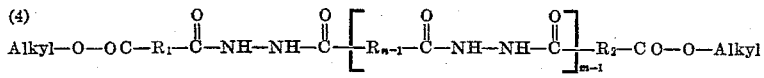

with an agent capable of splitting off water, and then hydrolyzing the carboxylic acid ester groups. The symbols R, R₁, R₂, $m$ and $n$ have the meanings given in Formula 2 above, and in at least one of the radicals R, R₁ and R₂ the carbon atom, which is bound to the radical containing the —CO— group, is present in a system of conjugated double bonds.

As examples of dicarboxylic acids, most of which are advantageously prepared in this manner, there may be mentioned the following compounds:

2:5-bis-[4'-carboxy-phenyl-(1')]-1:3:4-oxdiazole of the formula (5)

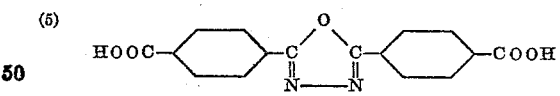

2:5-bis-[3'-carboxy-phenyl-(1')]-1:3:4-oxdiazole of the formula (6)

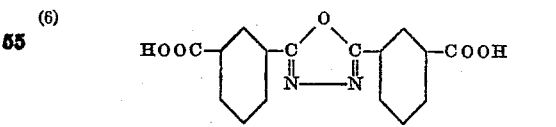

2:5 - bis - [4" - carboxy - diphenyl - (4')] - 1:3:4-oxdiazole of the formula (7)

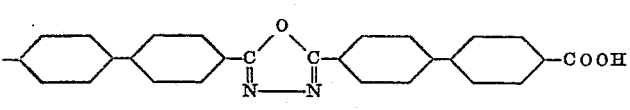

2 - [4' - carboxy - phenyl - (1')] - 5 - [5" - (4''' - carboxy - phenyl - (1''')) - 1":3":4" - oxdiazolyl - (2")]-1:3:4-oxdiazole of the formula (8)

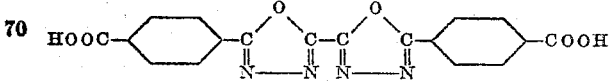

2 - [3' - carboxy - phenyl - (1')] - 5 - [5" - (3'" - carboxy - phenyl) - (1''') - 1":3":4" - oxdiazolyl - (2")] - 1:3:4-oxdiazole of the formula (9)
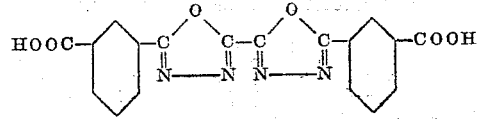

1 - [5' - (4'" - carboxy - phenyl) - (1''') - 1':3':4'-oxdiazolyl - (2')] - 4 - [5" - (4"" - carboxy - phenyl) - (1"")-(1":3":4"-oxdiazolyl-(2")]-benzene of the formula

(10)
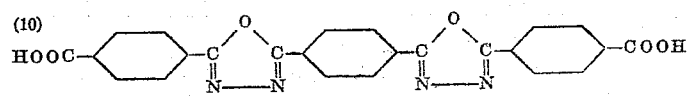

1 - [5' - (3'" - carboxy - phenyl) - (1''') - 1':3':4'-oxdiazolyl - (2')] - 4 - [5" - (3"" - carboxy - phenyl) - (1"")-(1":3":4"-oxdiazolyl-(2")]-benzene of the formula

(11)
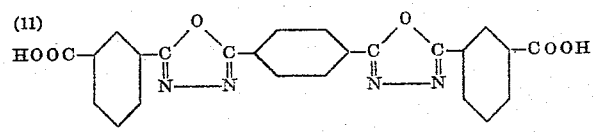

and 2' - [4" - carboxy - phenyl - (1")] - 1':3':4'-oxdiazolyl-(5')-β-acrylic acid of the formula

(12)
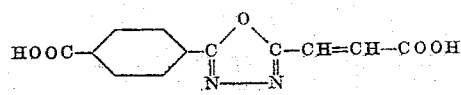

The reactive dicarboxylic acid derivatives are reacted either with aminoanthraquinones, advantageously α-aminoanthraquinones, for example 1-aminoanthraquinone itself, or with α-aminoanthraquinones containing further substituents. Among the latter valuable dyestuffs are obtained above all with 1-amino-5-aroylamino-anthraquinones, particularly 1-amino-5-benzoylaminoanthraquinones of which the benzoyl radicals may contain halogen atoms as substituents, such as iodine or bromine or especially chlorine and/or fluorine. As examples there may be mentioned 1-amino-5-benzoylamino-, 1-amino-5-(4'-chlorobenzoylamino)-, 1-amino-5-(2'-fluorobenzoylamino) and 1-amino-5-(2'-fluoro-4'- or -5'-chlorobenzoylamino)-anthraquinone.

When the reaction is carried out with anthraquinones which contain two free amino groups, in which case 1:5-diaminoanthraquinone is advantageously used, the free amino groups still present in the products so obtained are advantageously also acylated, the acylating agents being derived from monocarboxylic acids, advantageously monocarboxylic acids of the benzene series. In this connection there come into consideration primarily halides of those benzene carboxylic acids which are capable of yielding the radicals mentioned in the preceding paragraph.

The reactions of the present process, that is to say, the reaction of the dicarboxylic acid derivatives with the aminoanthraquinones and the subsequent further acylation with an acylating agent derived from a monocarboxylic acid which may be carried out if desired, are advantageously conducted in solvents or diluents, preferably those of high boiling point such as monochlorobenzene, di- or tri-chlorobenzenes, nitrobenzene or naphthalene, at a raised temperature, for example, between about 100° C. and the boiling point of the solvent or diluent used. The above mentioned reaction products obtainable from 1:5-diaminoanthraquinone and the dicarboxylic acids in the first stage, for which purpose it is of advantage to bring the 1:5-diaminoanthraquinone and dicarboxylic acid derivative into reaction in a molecular ratio ranging from 2:1 to 3:2, can be further acylated without being isolated from the reaction mixture. Dyestuffs of asymmetrical constitution are obtained when one molecular proportion of the dicarboxylic acid derivative is condensed with one molecular proportion of each of two amino anthraquinones.

The new vat dyestuffs of the foregoing constitution and obtainable as described above, can be used in known manner as such or in the form of their leuco-ester salts obtainable in known manner, for dyeing or printing a very wide variety of fibers of animal and especially vegetable character, for example, wool, silk but advantageously cotton, linen, artificial silk and staple fibers of regenerated cellulose and also superpolyamide fibers.

The dyeings and prints so produced are distinguished by their interesting tints and good properties of fastness.

The new dyestuffs are especially valuable because they are suitable for dyeing by various methods known for vat dyestuffs (at lower or higher temperatures). They are also distinguished by the fact that they yield alone or together with other dyestuffs dyeings of good fastness to light. In this connection there may be mentioned more especially the pure yellow-green tints which can be produced with known blue-green dyestuffs in admixture with those yellow dyestuffs of the present invention which contain twice the radical of 1-aminoanthraquinone or of a 1-amino-5-aroylaminoanthraquinone. In connection with the avoidance of injury to the fibers the new dyestuffs of the present invention are also advantageous.

The following examples illustrate the invention, the parts and percentages being by weight unless otherwise stated and the relationship of parts by weight to parts by volume being the same as that of the kilogram to the liter.

EXAMPLE 1

3.1 parts of 2:5-bis-[4'-carboxyphenyl-(1')]-1:3:4-oxdiazole of the formula (5)
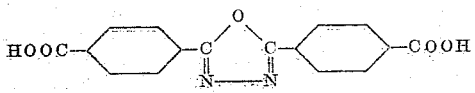

are heated with 15 parts of thionyl chloride, 0.05 part of pyridine and 200 parts of trichlorobenzene in the course of 1½ hours from 80° C., to the boil, while stirring. 20 parts of the solvent are then distilled off, and 4.6 parts of 1-aminoanthraquinone are added to the solution at about 100° C. The mixture is heated to 180° C., and stirred for 2 hours at 180-190° C. After cooling the mixture to 120° C., the precipitated yellow dyestuff of the Formula 1 above is filtered off, washed with alcohol and dried. It dissolves in concentrated sulfuric acid with a yellow coloration and dyes cotton from a red-violet vat fast greenish yellow tints.

By using, instead of 2:5-bis-[4'-carboxyphenyl-(1')]-1:3:4-oxdiazole, 3.78 parts of the compound of the formula (8)
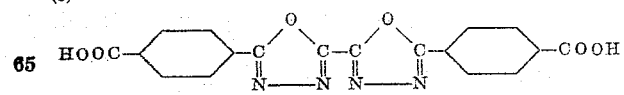

There is obtained a similar yellow dyestuff which dyes cotton from a bordeaux colored vat fast greenish yellow tints.

In the following table are given examples of further dyestuffs obtainable in an exactly analogous manner from 2 mols of the anthraquinone compounds mentioned in column I and 1 mol of the dicarboxylic acids given in column II, the properties of the dyestuffs being given in columns III and IV:

| | I<br>Anthraquinone components, 2 mols | II<br>Dicarboxylic acid, 1 mol | III<br>Dyeing on cotton | IV<br>Color of hydrosulfite vat |
|---|---|---|---|---|
| 1 | 1-Amino-5-benzoylaminoanthraquinone | 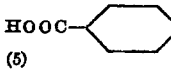 (5) | yellow | violet. |
| 2 | 1-Amino-5-(2'-fluorbenzoylamino)-anthraquinone. | 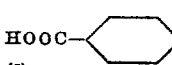 (5) | do | blue. |
| 3 | 1-Amino-5-benzoylaminoanthraquinone | 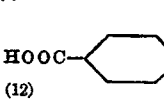 (12) | do | violet. |
| 4 | do |  (8) | do | Do. |
| 5 | 1-Amino-5-(2'-fluorbenzoylamino)-anthraquinone. | 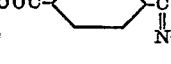 | do | bordeaux. |
| 6 | do | 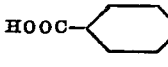 | do | violet. |
| 7 | 1-Aminoanthraquinone | 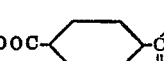 (5) | do | red violet. |
| 8 | 1-Amino-4-benzoylaminoanthraquinone | 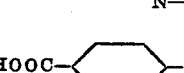 (5) | red | green blue. |
| 9 | 1-Amino-4-methoxyanthraquinone | 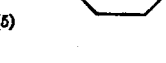 (5) | orange | red. |
| 10 | 1-Aminoanthraquinone | 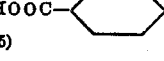 (6) | yellow | bordeaux. |
| 11 | 1-Amino-4-benzoylaminoanthraquinone | 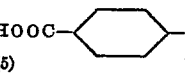 (6) | red | violet. |
| 12 | 1-Amino-5-benzoylaminoanthraquinone | 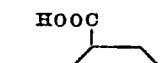 (6) | yellow | bordeaux. |
| 13 | 1-Amino-5-(2'-fluorbenzoyl-amino)-anthraquinone. | 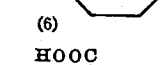 (6) | do | Do. |

Dyestuffs yielding yellow shades on cotton are also obtained by condensing one mol of a dihalide of a dicarboxylic acid listed in col. II (for example No. (5)) with one mol of a first (for example 1-amino-5-benzoylaminoanthraquinone) and one mol of a second (for example 1-amino-5-(2'-fluorbenzoylamino)-anthraquinone) aminoanthraquinone.

The dicarboxylic acids specified in the table are advantageously prepared as follows:

*Dicarboxylic acid of the Formula 5*

10 parts of symmetrical 4:4'-dicarbethoxy-dibenzoyl hydrazide are introduced at room temperature into 100 parts of chlorosulfonic acid. The temperature rises a few degrees with the evolution of hydrochloric acid gas. The solution so obtained is then heated to 50° C. in the course of 20 minutes, and then introduced into a mixture of water and ice. After stirring the mixture for a short time, the precipitated colorless product is filtered off and washed free from acid. The yield is greater than 90 percent of the theoretical yield. The 2:5-bis-[4'-carbethoxyphenyl-(1')]-1:3:4-oxdiazole so obtained crystallizes from aqueous dioxane in the form of needle-like lamellae melting at 215° C.

For the purpose of hydrolysis 3 parts of the ester are boiled under reflux for one hour with a solution of 10 parts of potassium hydroxide in 50 parts of alcohol. By the addition of 250 parts of water the greater part of the suspension is brought into solution. The mixture is filtered to remove undissolved constituents and the filtrate is acidified with a mineral acid. The precipitated 2:5-bis-[4'-carboxyphenyl-(1')]-1:3:4-oxdiazole of the Formula 5 is filtered off, washed and dried. There are obtained 2.3 parts of a colorless powder which is sparingly soluble in the usual solvents. From a large quantity of γ-valerolactone the acid crystallizes in the form of handsome coalesced needles, which do not melt at 360° C. The acid is easily soluble in dilute sodium carbonate solution.

The symmetrical 4:4'-dicarbethoxy-dibenzoylhydrazide mentioned above can be obtained, for example, by reacting terephthalic acid monoethyl ester chloride with terephthalic acid ethyl ester monohydrazide in pyridine or by the action of 1 mol of hydrazine hydrate on 2 mols of terephthalic acid monoethyl ester chloride in an inert diluent, for example, chloroform, with the addition of pyridine. The substance crystallizes from chlorobenzene in the form of colorless crystals melting at 197-198° C.

Dicarboxylic acid of the Formula 6

Into a solution of 26 parts of hydrazine sulfate in 384 parts of oleum (containing 24 per cent of SO₃) there are introduced, while cooling and stirring well, 69.7 parts of isophthalic acid in small portions in such manner that the temperature does not rise above 20° C. The mixture is then heated in the course of 30 minutes to 55° C., and is then stirred for 5-6 hours at 55-65° C., until the excess of dicarboxylic acid no longer diminishes. The whole is then allowed to cool, the clear reaction mixture is poured into ice water while stirring, the precipitated condensation product is filtered off with suction and washed several times with water.

For the purpose of purification, the condensation product may be dissolved in a cold dilute solution of sodium carbonate, freed from insoluble constituents by filtration, and reprecipitated by acidification with a dilute mineral acid. 2:5-bis-[3'-carboxyphenyl-(1')]-1:3:4-oxdiazole of the Formula 6 is obtained in the form of an almost white powder, which is easily soluble in a dilute aqueous solution of sodium carbonate. An aqueous solution of the disodium salt exhibits a bluish fluorescence when exposed to ultraviolet rays.

Dicarboxylic acid of the Formula 8

10 parts of the compound of the formula (13)

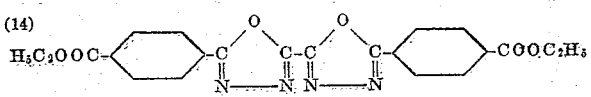

melting at 269-271° C. (obtainable, for example, by reacting 1 mol of oxalyl chloride with 2 mols of terephthalic acid monoethyl ester monohydrazide or by reacting 2 mols of terephthalic acid monoethyl ester chloride with one mol of oxalic acid dihydrazide) are introduced at room temperature into 100 parts of chlorosulfonic acid. The mixture is then heated in the course of ½ hour to 50° C., and the reaction product is then introduced into a mixture of ice and water. The precipitated substance of the formula (14)

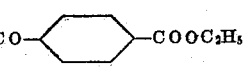

is filtered off and washed free from acid. The latter ester crystallizes from dioxane in the form of small coalesced crystals melting at 268-270° C.

In order to hydrolyze the ester groups 5 parts of the reaction product are boiled with a solution of 10 parts of potassium hydroxide in 35 parts of alcohol for one hour under reflux. Then dissolution of all but a small amount of material is brought about by the addition of water, and the solution is filtered. 2-[4'-carboxyphenyl-(1')]-5-[5''-(4'''-carboxyphenyl)-(1''')-1''':3'':4''-oxdiazolyl-(2'')]-1:3:4-oxdiazole of the Formula 8 is precipitated from the filtrate in the form of a colorless gel-like precipitate by the addition of a mineral acid. The precipitate is filtered off and thoroughly washed with hot water. For the purpose of purification, the dicarboxylic acid may be dissolved in a cold dilute solution of sodium carbonate, and reprecipitated with a mineral acid, after filtering the solution to remove a small amount of impurities. The dried acid is a colorless powder which does not melt when heated up to 360° C.

Dicarboxylic acid of the Formula 12

10 parts of the compound of the formula (15)

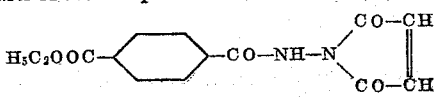

are introduced at room temperature into 100 parts of chlorosulfonic acid, whereupon the temperature rises slightly. The resulting solution is then heated in the course of ½ hour to 50° C., cooled and then poured on to a mixture of ice and water. The precipitated product of the rearrangement having the formula (16)

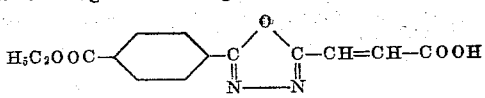

is filtered off and washed free from acid with water. It crystallizes from alcohol in the form of long silky needles melting at 189° C.

In order to hydrolyze the ester group 6 parts of the product are boiled with 50 parts of alcohol and 15 parts of sodium hydroxide solution of 30 per cent strength for 2 hours under reflux, then the mixture is diluted with 50 parts of water, filtered to remove impurities and acidified with a mineral acid. The precipitated colorless [2'-(4''-carboxyphenyl-(1'')-1''':3':4'-oxdiazolyl-(5')]-β-acrylic acid of the Formula 12 is filtered off and thoroughly washed with hot water. For the purpose of purification, the acid is dissolved in a cold dilute solution of sodium carbonate, and reprecipitated with a mineral acid, after filtering the mixture to improve impurities.

The compound of the Formula 15 can be obtained by condensing terephthalic acid ethyl ester monohydrazide with maleic anhydride. This condensation is advantageously carried out in an inert diluent, for example, benzene or chlorobenzene. The condensation product crystallizes from alcohol in the form of small colorless coalesced needles melting at 166-167° C. The substance is easily soluble in a dilute solution of sodium carbonate.

EXAMPLE 2

1 part of the dyestuff No. 2 of the table given in Example 1 is vatted at 45° C. in 100 parts of water with the addition of 4 parts by volume of sodium hydroxide solution of 30 per cent strength and 2 parts of sodium hydrosulfite. The resulting stock vat is added to a solution of 4 parts by volume of sodium hydroxide solution of 30 per cent strength and 2 parts of sodium hydrosulfite in 2000 parts of water. 100 parts of cotton are dyed in the resulting bath for one hour at 40-50° C. with the addition of 10 parts of sodium chloride. The cotton is then squeezed, oxidized in the air, rinsed, acidified, again rinsed and soaped at the boil. It is dyed yellow, and the dyeing has good properties of fastness.

What is claimed is:

1. An anthraquinone vat dyestuff of the formula

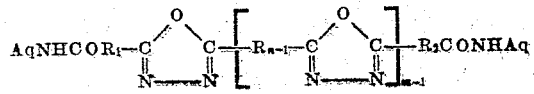

in which $m$ and $n$ represent whole numbers of at the most 2, R is phenylene, $R_1$ is a member selected from the group consisting of a phenylene and diphenylene, $R_2$ is a member selected from the group consisting of —CH=CH—, phenylene and diphenylene, and Aq is anthraquinonyl bound in an α-position to the —NH—group.

2. The anthraquinone vat dyestuff of the formula

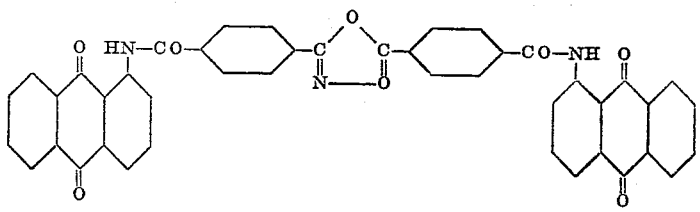

3. The anthraquinone vat dyestuff of the formula

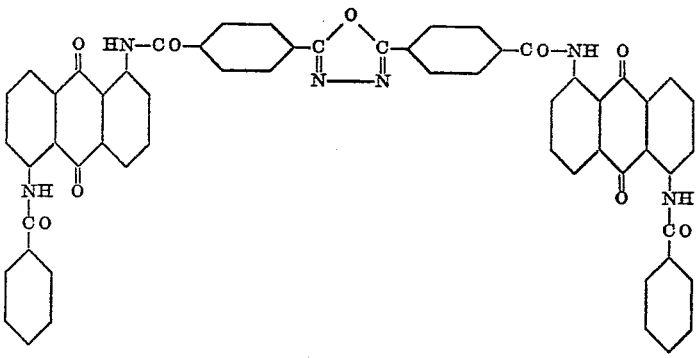

4. The anthraquinone vat dyestuff of the formula

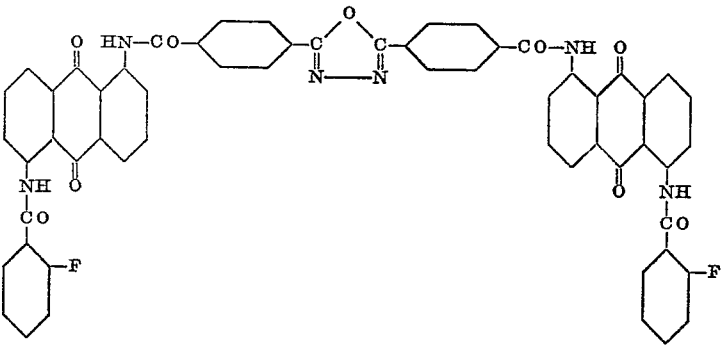

5. The anthraquinone vat dyestuff of the formula

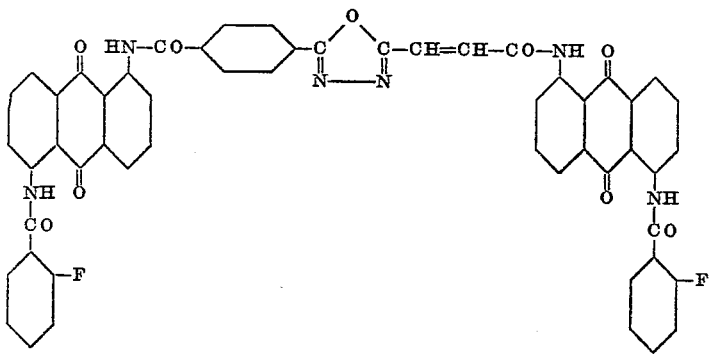

6. The anthraquinone vat dyestuff of the formula

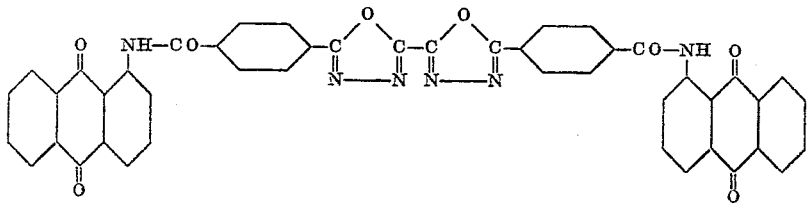

7. An anthraquinone vat dyestuff of the formula

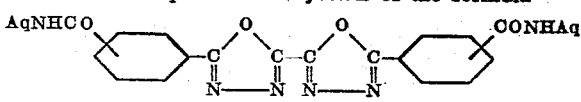

in which Aq is anthraquinonyl bound in an α-position to the —NH— group.

8. An anthraquinone vat dyestuff of the formula
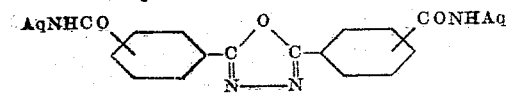
in which Aq is anthraquinonyl bound in an α-position to the —NH— group.
References Cited in the file of this patent
UNITED STATES PATENTS
| | | |
|---|---|---|
| 2,464,831 | Stilmar | Mar. 22, 1949 |
| 2,511,018 | Stilmar | June 13, 1950 |
| 2,511,019 | Stilmar | June 13, 1950 |
| 2,601,179 | Stilmar | June 17, 1952 |
| 2,628,230 | Stilmar | Feb. 10, 1953 |
| 2,629,718 | Belshaw et al. | Feb. 24, 1953 |